C. R. BURLEW.
THERMOSTATIC CIRCUIT CONTROLLER.
APPLICATION FILED MAR. 22, 1915.
1,252,393.
Patented Jan. 8, 1918.
2 SHEETS—SHEET 1.
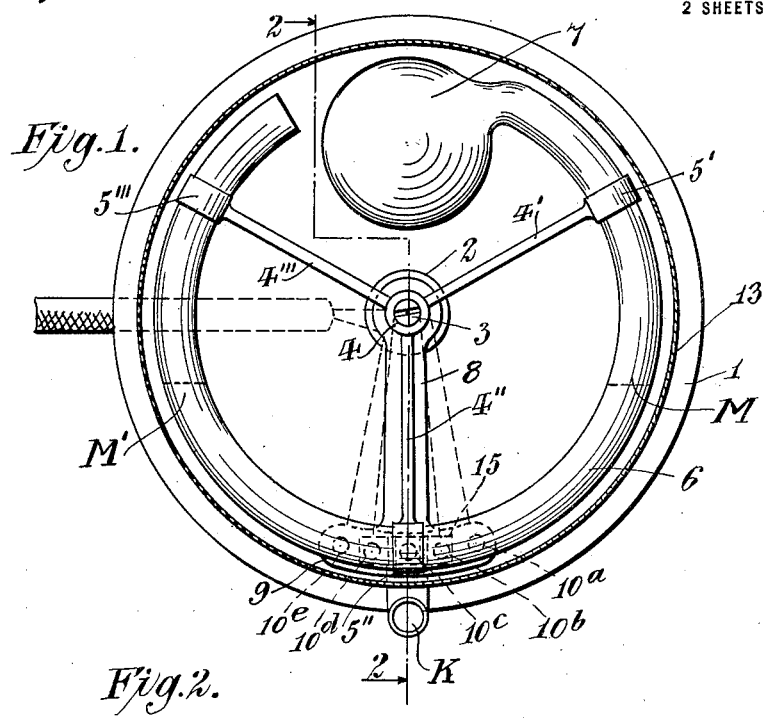
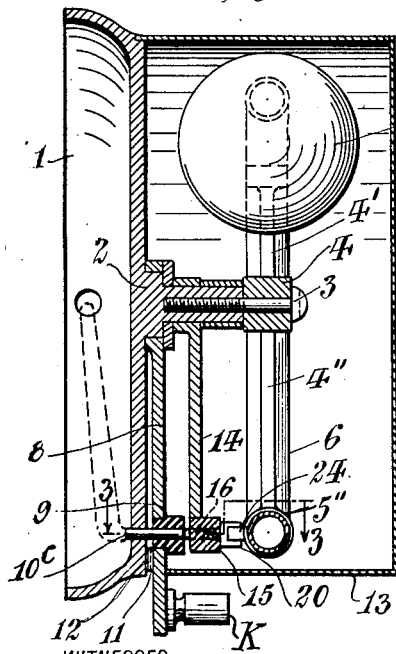
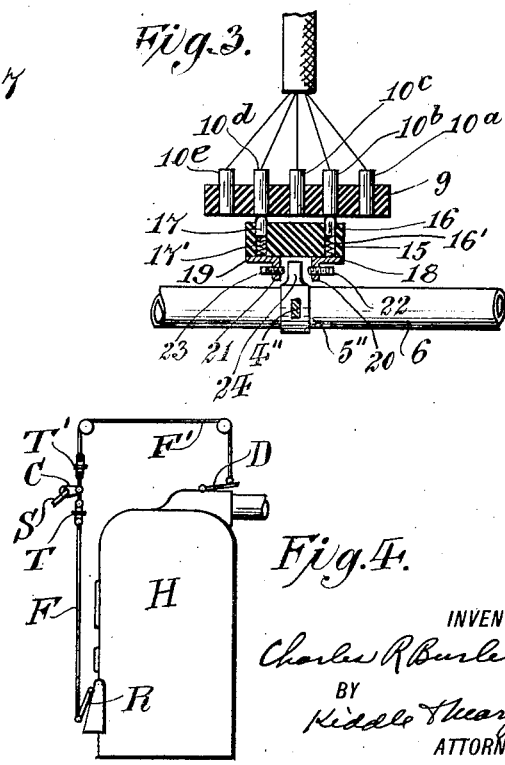
WITNESSES
INVENTOR
Charles R Burlew
BY
ATTORNEYS

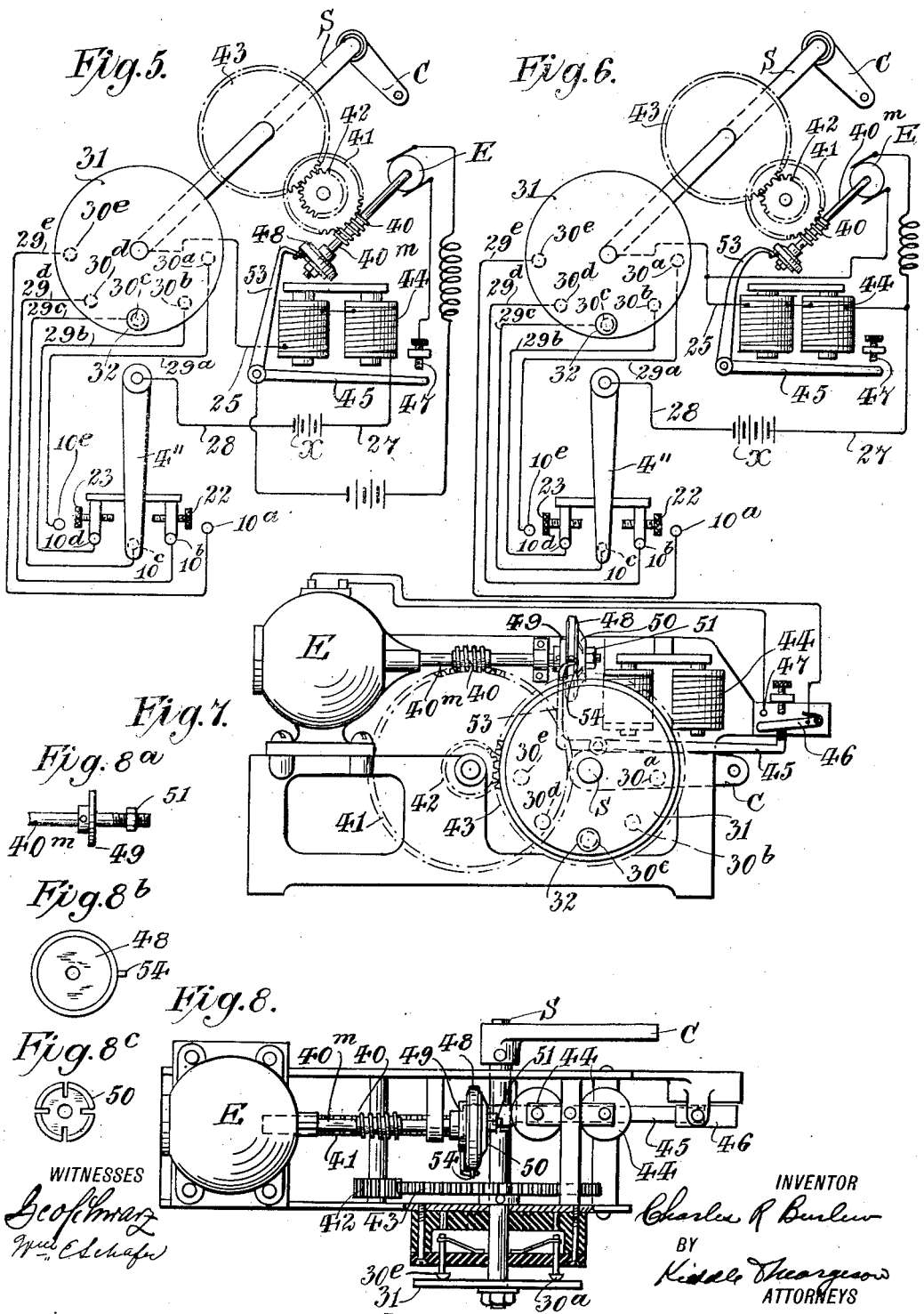

UNITED STATES PATENT OFFICE.

CHARLES R. BURLEW, OF YONKERS, NEW YORK.

THERMOSTATIC CIRCUIT-CONTROLLER.

1,252,393.  Specification of Letters Patent.  Patented Jan. 8, 1918.

Application filed March 22, 1915. Serial No. 16,031.

*To all whom it may concern:*

Be it known that I, CHARLES R. BURLEW, a citizen of the United States, and a resident of Yonkers, county of Westchester, State of New York, have invented a new and useful Improvement in Thermostatic Circuit-Controllers, of which the following is a specification.

The invention relates to a system or device having a thermostat or a thermostatic controller in which a thermostatic actuating member, for example a member comprising a balanced tube containing a fluid or fluids susceptible to the changes of temperature, is adapted, by a change of its position, to cause the closing of some certain electric circuit when there is a certain change in the temperature of the atmosphere that is within the room or place where the thermostat is located.

In a form of thermostat or thermostatic device employing a balanced tube such as just mentioned a wheel-like construction is preferably provided, in which a tube that is bent into circular form constitutes the peripheral portion of the wheel. This bent tube, or receptacle as it may be called, has a bulb or enlargement at one end thereof. It is movably supported through a medium of radiating arms and a hub, the latter of which is mounted upon a bearing-pin that is carried in the frame or body portion of the thermostat. A gas, vapor or readily vaporized liquid, any one of which is a fluid, is confined within the bulbous end portion of the tube, either directly or indirectly, by a column or mass of mercury or other suitable fluid.

The expansive force of the gas or vapor in the bulbous portion of the tube acts upon the mercury in the tube to move the mercury along the tube. The center of gravity of the wheel, therefore, varies according to the temperature of the air surrounding the tube, since, as above indicated, the position of the center of gravity of the mercury varies, relative to the bent tube or receptacle, due to the expansive force of the gas or vapors acting to move the mass or column of mercury, and to some extent, due to the variation of the volume of mercury itself. The balanced tube construction above referred to can properly be called and in fact is frequently hereinafter denoted as a thermostatic controlling member and also as a thermostatic actuating means.

The balanced tube construction is associated with a series of relatively fixed or stationary contact pins that are comprised in a respective number of electric circuits, and according to one phase of my invention there is provided a movable member, such as a movable arm, for carrying a plurality of relatively movable contact members or pins that are arranged so as to engage the relatively stationary contact pins just referred to in order to complete the proper circuit.

This movable arm, with the contacts thereupon, is frequently referred to as the circuit closing arm or circuit closing member. It is actuated by the balanced tube construction— that is, the thermostatic controlling member or the thermostatic actuating means— through mechanism located between said arm and said tube construction. The mechanism just referred to is constructed and arranged so that as long as the balanced tube 6 moves in the same direction the circuits will be successively closed. This mechanism is, however, constructed so that when the balance tube moves a sufficient distance in a direction the reverse to that which it previously moved when positioning the circuit closing arm, the circuit next to that last closed will be skipped and an advanced circuit will be closed. For this reason the mechanism between the balanced tube construction and the circuit closing arm has been called the advancing mechanism since it advances the closing of a circuit each time the balanced tube is caused to move the contacts which are carried by or controlled by the circuit closing arm, in a direction the reverse to that which the tube previously moved said contacts. The balanced tube construction as previously indicated is in effect a thermostatic controlling member, the function of which is to actuate the circuit closing arm or circuit closing member, and it will be noted that many other forms or types of thermostatic controlling members might be employed in the place of—and in many respects would be the equivalent of—the balanced tube construction. According to one phase of the invention an important feature resides in the utilization of the advancing mechanism which is associated with the thermostatic controlling member and the circuit closing arm or member. The function of this advancing mechanism is, as above indicated, to insure the closing of an advance circuit each time the thermostatic controlling member is caused to move the contact arm or member in a direction reverse to that in which the thermostatic controlling member has previously moved said contact arm or member. In other words, due to the advancing mechanism, an advance circuit is closed—or a circuit is skipped being closed—each time the thermostatic controlling member, by way of example, causes a closing of a circuit when a sufficient or predetermined drop in temperature takes place after the thermostatic controlling member has caused a closing of the circuit due to a previous ascending change in temperature.

The system which is described in the present application is similar in many respects to but is an improvement upon, the system which is shown and described in my U. S. Patent No. 1,118,328, dated November 24, 1914. The system which is shown and described in the present application, as well as that which is shown and described in said patent, comprises a thermostat, a heater having a draft modifying mechanism associated therewith,—which mechanism may comprise a draft regulator or a check damper, or both of said members,—a motor for operating said draft modifying mechanism, the operating circuit of which motor is under the control of an electro-magnet that is comprised within and common to several circuits, any one of which can be closed—one at a time—by a circuit closing member which is operatively connected to the thermostat; thus energizing the electro-magnet whereby the motor circuit is closed and is retained closed until the draft modifying mechanism has assumed a new position that is dependent upon the position of the movable members of the thermostat and the controlling member connected thereto.

The system also comprises mechanism—sometimes referred to as a regulating mechanism—which is operatively connected to said motor and, therefore, coöperatively related to said draft modifying mechanism. The function of said regulating mechanism is to break the particular circuit which has been completed by the thermostat and the circuit closing member connected thereto or comprised therein.

My new thermostatic device is particularly adaptable for use in a temperature regulating system having the features of construction just referred to, but it is not necessarily limited in its use to such a system.

The construction and mode of operation of this particular thermostat or thermostatic device and a system in which it may be employed to advantage will hereinafter be more specifically pointed out.

As showing certain specific embodiments of the invention, reference is made to the drawings forming a part of this specification, in which drawings, Figure 1 is a front elevation of my new thermostat, or thermostatic device as it may be called.

Fig. 2 is a view taken on the line 2—2 of Fig. 1, looking in the direction of the arrows.

Fig. 3 is a view taken on the line 3—3 of Fig. 2, looking in the direction of the arrows.

Fig. 4 is a diagrammatic view showing a heater with draft modifying mechanism comprising a draft regulator and a check damper, both of which are operatively connected to a crank that is carried by a shaft which is operated by a motor.

Fig. 5 is a diagrammatic view including the circuit connections of one form of a complete system arranged in accordance with my invention. In this figure, however, the heater and draft modifying mechanism therefor have been omitted, but there is shown the crank for operating said mechanism.

Fig. 6 is a diagrammatic view including the circuit connections of another form of complete system arranged in accordance with my invention. In this figure, however, the heater and draft modifying mechanism therefor have been omitted, but there is shown the crank for operating said mechanism.

Fig. 7 is a side view of a motor and regulating mechanism.

Fig. 8 is a plan view of the motor and regulating mechanism shown in Fig. 7; and Figs. 8$^a$, 8$^b$ and 8$^c$ are views of detail parts which are comprised in the brake mechanism for stopping the motor.

The thermostatic device shown in Figs. 1, 2 and 3 comprises a vertically extending frame, body portion, or wall base 1 which carries a horizontally and forwardly extending supporting member or stud 2 that receives the bearing pin 3 upon which there is mounted, so as to be free to move thereon, the hub 4 of a wheel-like construction. This hub carries the radially extending arms 4', 4'', and 4''', the outer ends of which arms are provided with retaining bands 5', 5'' and 5''', that surround a circularly bent tube or receptacle 6 having a bulb or enlargement 7 at one end thereof. The other end of this tube is preferably open, but under some conditions it might be sealed. This tube 6 and its associated parts are so mounted on said bearing pin 3 that they are free to swing angularly; that is to say, so that the lower portion of the tube is free to move either to the right or left. The tube 6 and its associated parts constitute the thermostatic controlling member or the thermostatic actuating means of the thermostatic device.

A radiating arm 8 carrying an insulating member 9, through which pass contact pins 10ª, 10ᵇ, 10ᶜ, 10ᵈ, 10ᵉ, is mounted on the supporting member or stud 2 so that it may be adjusted to the right or to the left, when desired. This arm 8, however, is normally stationary being held in a stationary position, as by a tooth 11 engaging a dwell in a detent segment or rack 12. This arm 8 projects through a covering or casing 13 within which the movable members of the thermostat are preferably inclosed, and the exposed portion of the arm is provided with a knob K whereby the arm can be manually adjusted or moved from one position to another position, as desired.

In all desired positions the tooth 11 can engage a corresponding dwell in the detent segment or rack. The contact pins carried by this arm are called the relatively stationary contacts and the arm 8 may be referred to as an adjustable member mounted on the frame and carrying stationary contacts. Said arm 8 can be adjusted so as to position and so as to hold stationary in adjusted position the contacts carried thereby.

There is also mounted upon the forwardly extending projection or stud 2 another radiating arm 14 which is free to swing thereon. This radiating arm 14 carries at its outer end an insulating member 15 through which pass spring pressed contact pins 16 and 17, so arranged as to make engagement with the relatively stationary contact pins 10ª, 10ᵇ, 10ᶜ, 10ᵈ, 10ᵉ, as the arm 14 is moved back and forth; that is, from right to left, or from left to right. The contact pins 16 and 17 are called the relatively movable contacts and they move simultaneously in the same direction. Behind the contact pins 16 and 17 and electrically connected therewith as by means of springs 16' and 17', are metallic plates 18 and 19 having projections 20 and 21 through which pass the metal adjusting screws 22 and 23. A projection 24, which is on and integral with one of the retaining bands 5'', is arranged to engage these adjusting screws 22 and 23, independently, dependent upon the direction of movement of the arm 14. The tube or receptacle 6 is partially filled with a heavy liquid substance, preferably mercury, for instance to the height noted by dotted lines M—M', Fig. 1, thus making a low center of gravity. The portion of the tube 6 above the line M and including the bulbous or enlarged portion 7 contains and incloses a gas, vapor or readily vaporized substance, which is relatively sensitive to temperature changes, such a substance, for instance, as sulfuric ether.

It will thus be manifest from what has preceded that the function of the tube having the enlargement thereupon is to provide a receptacle having therein a heavy liquid which moves, as when the expansion or contraction of the light or gaseous substance takes place, thus changing the center of gravity of the receptacle and its contents and, consequently, that of the wheel-like structure. The latter being free to move assumes a new balanced position dependent upon the temperature of the surrounding atmosphere; or, in other words, the position of the movable members in this thermostat is dependent upon the temperature of the surrounding atmosphere because the center of gravity of the members that comprise said tube 6 and its contacts is changeable in a manner dependent upon the temperature of the surrounding atmosphere. The tube with the fluid or fluids therein and its associated movable parts, to wit, the construction which constitutes the wheel-like structure, may be considered to be and in effect is a thermostatic controlling member, the function of which is to actuate or position the circuit closing arm or member.

This thermostat is connected in either of the systems shown in connection with Figs. 4, 5 and 6 in a manner which will be subsequently described in detail.

In Fig. 4, H designates a heater provided with a draft regulator R and a check damper D. This draft regulator R and check damper D are connected to a crank C, that is carried on a shaft S, by means of the respective flexible connectors F, F', having therein turn buckles T, T' which provide a means for making any comparatively permanent but desired adjustments between the crank C and the draft regulator on the one hand and the check damper on the other.

This mechanism just described, comprising said draft regulator and check damper, constitutes a device for modifying the draft supplied to the heater and hence may be called a draft modifying mechanism. It is understood that the mechanism actuated by the crank arm may be and is referred to as a draft modifier, and this expression is intended to cover a construction where only a draft regulator or a check damper is used to modify the action of the draft supplied to or passing through the heater, as well as to a construction which employs both a draft regulator and a check damper for modifying said draft.

The crank C, as above indicated, is mounted upon the shaft S and is operated by the electric motor E through the chain of gearing shown in detail in Figs. 7 and 8 and which chain comprises the worm-gear 40, the worm-wheel 41, pinion 42, and the gear-wheel 43 that is connected to the shaft S.

In Figs. 5 and 6 the motor and the gearing are shown diagrammatically, but as the same parts thereof are indicated in each of said figures they have been given the corresponding reference characters. The same frame which supports the motor and gearing thus described also carries an electromagnet 44. This electromagnet, when energized, lifts an armature 45 which in turn engages a contact member 46 (see Figs. 7 and 8) that in turn closes a circuit, when the armature is lifted, said circuit being the motor starting circuit. The armature, however, might comprise therein, as a part thereof, this contact member 46. In Figs. 5 and 6 the armature is indicated diagrammatically as making a direct engagement with the contact point 47, for the purpose of completing the motor circuit.

The electromagnet just referred to has one terminal thereof grounded in that portion of the system which comprises the electric motor and the regulating mechanism, and this is indicated by the wire 25 being grounded on the shaft S in both Figs. 5 and 6. The other terminal of the electromagnet 44 is connected to the wire 27 which in turn is connected to one pole or terminal of the source of supply; the other pole or terminal of the source of supply is electrically connected by means of the wire 28 to the frame 1 of the thermostat previously described, or at least to the projection 24 that is integral with the band 5″ on arm 4″. The several contact pins $10^a$, $10^b$, $10^c$, $10^d$ and $10^e$ are connected respectively by the wires $29^a$, $29^b$, $29^c$, $29^d$, $29^e$ to the contact pins $30^a$, $30^b$, $30^c$, $30^d$, $30^e$, the latter of which may be considered to constitute a part of the regulating mechanism shown in Figs. 7 and 8. Each of these pins $30^a$, $30^b$, $30^c$, $30^d$, $30^e$ engages a metallic disk 31 whereby a circuit when closed will permit the flow of electricity from any one of said pins to said disk. This disk, however, is provided with an insulating plug 32 which can be moved to engagement with any one of said pins so as to intercept or open a circuit which includes the pin engaged by said insulating plug.

Assuming the wheel-like construction, or the thermostatic controlling member, has just moved to a new position whereby the projection 24 by engaging with the screw 22 has forced the contact pins 16 and 17 to the right so as to make engagement respectively with the stationary contact pins $10^b$ and $10^d$, for example, a circuit will then be completed through contact pin $10^b$ and only through that pin, (it being noted that the projection 24 does not engage the screw 23 whereby a circuit could be completed which includes said last mentioned screw) the wire $29^b$, the contact $30^b$, the disk 31, the shaft S, and the wire 25, electromagnet 44, the wire 27, source of supply X, wire 28, frame 1 and arm 4″. This, as above indicated, will energize the electromagnet and cause a completion of the circuit through the motor, whereby the draft modifying mechanism will be actuated. The movement of this draft modifying mechanism will continue until the current that supplies the motor, or until the circuit which causes the current to be supplied to the motor, is intercepted. This interception of the motor current is effected by means of the regulating mechanism which comprises the disk 31, shown in detail in Figs. 7 and 8. This disk 31 is operated by the motor and hence is operatively associated with the draft modifying mechanism which is actuated by said motor. The insulating plug in said disk is so related to the draft modifying mechanism that when said mechanism has reached a certain one of a series of stops or positions, (which position is dependent upon the particular circuit that includes the electromagnet 44 that is closed by the movement of the projection 24 engaging one of the screws 22 and 23) the insulating plug will cause an intercepting of the circuit thus completed.

A more detailed description of the operation of the thermostat is as follows:

Assuming the parts to occupy a position as indicated in the drawing and that there is an increase of temperature the gas in the bulbous or enlarged portion 7 is expanded and the mercury is forced up the tube or receptacle 6, thereby establishing a new center of gravity. The tube 6 being free to move on its bearing pin 3 swings in an opposite direction carrying the projection 24 into contact with the screw 22. This establishes an electric circuit from the vertically extending frame or wall base—which is of metal having an electric wire grounded therein—through bearing pin 3, hub 4, radiating arms 4″, band 5″ projection 24, screw 22, metallic plate 18, contact pins $10^b$, for example, wire 29, leading from said contact pin $10^b$, through the coils of the electromagnet 44 referred to and then through proper connections, above described, back to the frame 1.

The electric circuit which is thus completed by the arm 4″ and the projection 24 energizes the electromagnet 44 which lifts the armature 45 and thus completes the motor circuit. A further increase of temperature causes the mercury in the tube 6 to again change the center of gravity, forcing said tube still farther along in the same direction that the tube previously traveled. The projection 24 being in contact with the screw 22 carries the radiating arm 14 which is free to move on its bearings, its insulating member 15, together with the contact pins 16 and 17 and other attachments, along the relatively stationary contact pins $10^a$, $10^b$, $10^c$, $10^d$ and $10^e$, thus establishing a circuit the same as before, except with a different contact, namely, contact pin $10^a$, for example; thus energizing, as before, the motor mechanism which actuates the draft modifying mechanism.

Now, assuming the parts to still occupy the position last referred to, with contact pin 16 in engagement with contact pin $10^a$, a decrease of temperature draws the mercury of the tube 6 in an opposite direction from that caused by the increase of temperature. The center of gravity of the tube 6 and its associated parts is now changed and tends to swing the projection 24 in an opposite direction so that the latter comes in contact with the screw 23. A circuit is established, as before, except through different contact pins and it will be noted that as soon as the projection 24 strikes screw 23 a circuit will be established through contact pins 17 and 10$^c$, thus skipping the closing of the circuit comprising stationary pins 10$^b$. The previously described circuit thus completed, as in all the other circuits, remains completed until the draft modifying mechanism assumes its proper position.

An inspection of Fig. 3 will make it clear that the contact pins 16 and 17 simultaneously engage two of the contact pins 10$^a$, 10$^b$, 10$^c$, 10$^d$, 10$^e$, and that when two of the last mentioned sets of pins are thus engaged there is located between the pins thus engaged a stationary pin which is not engaged. In other words, when the pins 16 and 17 respectively engage, for example, the stationary contact pins 10$^d$ and 10$^b$ there is located between the latter a contact pin, namely, 10$^c$, which is not engaged. Due to this arrangement of the contact pins there can be a definite progressive series of changes imparted to the position of the draft modifying mechanism as the temperature within the room, for example, increases and this change in the position of the draft modifying mechanism can be, for example, one unit—whatever that may be—for each unit of increase in temperature of the room. When, however, the temperature in the room changes in an opposite direction, that is, changes from an increasing temperature and drops to a lower temperature, or vice versa, then the draft modifying mechanism will be changed two units because of the skipping of one of the circuits, due to the arrangement just referred to.

The mechanism just referred to is constructed and arranged so that as long as the balanced tube 6 moves in the same direction the circuits will be successively closed. This mechanism, however, is constructed so that when the balanced tube, or the thermostatic controlling member, moves a sufficient distance in a direction the reverse to that in which it previously moved when positioning the circuit closing arm, the circuit next to that last closed will be skipped and an advance circuit will be closed. For this reason, as has been previously indicated, the mechanism between the balanced tube construction, that is the wheel-like structure, or the thermostatic controlling member, on the one hand and the circuit closing arm or member on the other, has been called the advancing mechanism since it advances the closing of a circuit each time the balanced tube 6 is caused to move the relatively movable contacts in a direction the reverse to that which it previously moved said contacts.

By the interposition between the thermostatic controlling member and the movable contact member—or circuit closing member—of the advancing mechanism the thermostatic controlling member and the movable contact member can occupy different relative positions for the same position of the thermostatic controlling member whereby the latter will effect or cause a closing of one circuit when a progressive increase of temperature causes the thermostatic controlling member to move in one direction to a definite position and whereby the thermostatic controlling member will effect or cause the closing of another circuit when a progressive decrease of temperature causes the thermostatic controlling device to move in the opposite direction to substantially the same definite position. The specific form of advancing mechanism illustrated in Fig. 3 depends for its operation upon a lost motion construction which comprises the projection 24 that vibrates or oscillates between the screws 22 and 23 of the movable contact member and due to the particular spaced relationship of the contact members 16 and 17 the lost motion construction just referred to can constitute an important part of the particular form of advancing mechanism illustrated in said figure.

The principal difference between the form of apparatus shown in Figs. 5 and 6 consists in the manner of supplying the source of electrical supply for operating the electromagnet and for operating the motor.

In the form shown in Fig. 5 the electromagnet may be operated by a suitable battery current, while the motor, if desired, could be operated from any suitable source of current, as an ordinary street current; while in the form shown in Fig. 6 the same source of supply is used for both the electromagnet and the motor and in this form I have found it preferable to use a battery.

A brake mechanism for arresting the movement of the motor is shown in Figs. 7 and 8 and more in detail in Figs. 8$^a$, 8$^b$ and 8$^c$. This brake mechanism comprises a member 48 that rotates with the motor shaft 40$^m$ or a shaft that is driven by the motor when the motor is being supplied with electrical energy. This brake member 48 is held in place by being clamped between a resisting member 49 and a spring member 50, which members 49 and 50 comprise clamping members. The spring clamp member 50 is held in place by the nut 51 which is screw-threaded on the shaft 40$^m$, that carries the brake member 48 and with which said member is rotatable. As, however, the brake member 48 is caused to rotate merely because of the friction existing between the clamping members and the brake member 48, it will be manifest that a slippage can take place between them when the brake member 48 is suddenly stopped, but that in the slipping which thus takes place energy is absorbed which tends to and does arrest the movement of the movable parts of the motor, thus insuring a stoppage of the draft modifying mechanism in the correct position and the preventing of the insulating plug being moved from the place where it causes a break or interception of the circuit that includes the contact which engages said insulating plug.

The armature 45, therefore, has connected thereto an arm 53 which is arranged so as to engage or be engaged by a pin, when the armature 45 is in its lower position; or, when the circuits comprising the electromagnet 44 and the several wires 29ª, 29ᵇ, etc., are broken so that no current can flow through said electromagnet, whereby the armature will be free to drop. This pin 54 is on and constitutes a part of the rotatable brake member 48 and it will thus be observed that when the magnet 44 is deënergized that the pin 54 will either engage or be engaged by the arm 53, thus causing the member 48 to perform the functions of a brake that is under the control of the armature 45 of the electromagnet 44.

The improvements herein set forth are not limited to the precise construction and arrangement shown and described, as they may be embodied in various forms and modifications without departing from the spirit and scope of the invention.

What I claim as my invention is:

1. A thermostat having in combination a frame or body member, a series of stationary contacts mounted thereupon, a movable circuit closer carrying a plurality of contacts arranged to simultaneously engage in succession a plurality of the contacts in said series, a thermostatic actuating means mounted upon the body member, and mechanism between said actuating means and said circuit closing member for moving the contacts thereof along said series of contacts, said mechanism and the circuit closer being constructed and arranged so that a circuit will be established through only a part of the plurality of the circuit closing contacts at any one time dependent upon the direction in which said mechanism is moved by the thermostatic actuating means.

2. A thermostatic controller comprising in combination a frame or body member, a series of relatively stationary contacts mounted upon said frame, a thermostatic actuating means, a circuit closer carrying a plurality of relatively movable contacts which can simultaneously engage contacts in said series of stationary contacts, and mechanism between said actuating means and said circuit closer for moving, by said actuating means, the contacts carried by said closer along and into engagement with said series of relatively stationary contacts, said mechanism being constructed and arranged in respect to the circuit closer so that the circuit next to that last closed will be skipped and an advanced circuit will be closed when the thermostatic actuating means causes the circuit closer to move a sufficient distance in a direction the reverse to that in which it was previously moved.

3. In a thermostatic controller, a frame or base member, provided with a series of stationary contacts, a thermostatic operating member and contact means for successively engaging said stationary contacts electrically on movement of said thermostatic operating member in one direction and for skipping the electrical engagement of the stationary contact next to the stationary contact last engaged on movement of said thermostatic operating member in the reverse direction.

4. In combination a thermostatic actuating means, a series of relatively stationary contacts, a circuit closer movable along said stationary contacts, and mechanism whereby said actuating means will actuate said circuit closer, said mechanism and the circuit closer being constructed and arranged so that as the actuating means moves the circuit closer in the same direction the circuits including said stationary contacts will be successively closed and so that when the thermostatic actuating means moves the circuit closer in a reverse direction, a circuit will be skipped from being closed and an advanced circuit will be closed.

5. A thermostatic controller having a series of relatively stationary contacts, a circuit closer movable along said stationary contacts, means susceptible to temperature variations for actuating said circuit closer, and mechanism between said actuating means and said circuit closer constructed so that as the temperature continues to change in the same direction circuits comprising contacts of said series will be successively closed, and also constructed so that when the temperature progressively changes in a reverse direction a circuit will be skipped being closed and circuits comprising contacts of said series will be successively closed in an order the reverse of that in which they were previously closed.

6. A thermostatic controller having a series of stationary contacts, a thermostatic controlling member susceptible to temperature variations, a circuit closing member actuated in reverse directions by said thermostatic controlling member, which circuit closing member is associated with said stationary contacts so that it can successively close circuits in which the stationary contacts are comprised, and an advancing mechanism between said thermostatic controlling member and said circuit closing member to effect a closing in succession of successive circuits on movement of said circuit closing member in one direction and to skip the closing of one circuit and effect a closure in succession of subsequent successive circuits on movement of said circuit closer in a reverse direction.

7. The combination with a thermostatic controlling member of a series of successive contacts adapted to control circuits which are successively closed by a movable contact member as the thermostatic controlling member is caused to operate, due to changes of temperature in the same direction, and an advancing mechanism between the thermostatic controlling member and the movable contact member, the thermostatic controlling member being movable relatively to the advancing mechanism so that when the temperature changes in a reverse direction a circuit next to the circuit last closed will be skipped and an advance circuit will be closed.

8. In combination a thermostatic member, a series of contacts, a circuit closer associated with said series of contacts and controlled or actuated by said thermostatic member, and an advancing mechanism between and associated with said circuit closer and said thermostatic member, which advancing mechanism is constructed so that upon a sufficient reverse movement of the thermostatic member a circuit will be skipped and advanced circuit will be closed by said circuit closer.

9. In combination a thermostatic controlling member, a circuit closer, a series of successive contacts adapted to control circuits which are successively closed by said circuit closer as the thermostatic controlling member moves in the same direction, and an advancing mechanism which, when the thermostatic controlling member moves in a reverse direction, causes a circuit next to the circuit last closed to be skipped, and which upon a continued movement of the thermostatic controlling member in such reverse direction causes the circuits in the series to be successively closed.

10. A thermostat comprising in combination a frame, a thermostatic actuating means supported on said frame, a series of relatively stationary contacts adjustably mounted on said frame, a movable member carrying thereupon a plurality of insulated contacts, and mechanism between the thermostatic actuating means and said movable member whereby said thermostatic actuating means will position said movable member so that the contacts thereupon will successively engage said stationary contacts and whereby an electric circuit will be completed through only a part of the contacts that are carried in said movable member.

11. A thermostat having a frame, an adjustable arm carrying a series of relatively stationary contacts, a movable arm carrying contact means movable relatively to, successively along, and in engagement with, said stationary contacts, a thermostatic actuating means mounted upon said frame, and mechanism whereby the motion of said thermostatic actuating means will be imparted to said movable arm, which mechanism is constructed so that as the thermostatic actuating means moves the contact means in the same direction circuits comprising said stationary contacts will be successively closed but so that when a reverse movement of the contact means is effected a circuit will be skipped being closed after which, during a continued movement in said reverse direction, the circuits will be successively closed.

12. The method of controlling the distribution of current to a series of circuits which consists in closing and opening breaks in said circuits successively in controlling the series in one order and in omitting the closure of the break next to the one last made in closing and opening the breaks in the reverse order.

13. In a system of the class described a series of three or more stationary contacts, a member susceptible to temperature changes, a circuit closer associated with said stationary contacts and arranged to successively engage said stationary contacts, and mechanism for actuating said circuit closer from said member that is susceptible to temperature changes, said mechanism and said circuit closer being constructed and arranged to cause a closing of an advanced circuit when the circuit closer is actuated in a direction the reverse of that in which it previously moved.

14. In a system of the class described a frame, a thermostatic actuating means, a member adjustably mounted on said frame and carrying relatively stationary contacts, a radiating arm mounted on said frame and carrying relatively movable contacts for cooperating with the relatively stationary contacts, and an advancing mechanism between the actuating means and said movable member to effect a closing in succession of successive circuits on movement of said movable contact in one direction and to skip the closing of one circuit and to effect a closure in succession of subsequent successive circuits on movement of said movable contact in a reverse direction.

15. A thermostat having in combination a frame, a thermostatic member mounted on said frame, a series of stationary contacts mounted on said frame, a circuit closing member coöperatively related with said stationary contacts and arranged to successively engage the latter and mechanism between said thermostatic member and said circuit closing member for causing the latter to be actuated by the thermostatic member, which mechanism is constructed and arranged so that the movable contact member can occupy different positions for the same position of the thermostatic member whereby said mechanism will operate as an advancing mechanism.

16. A thermostat of the class described comprising in combination a frame or basemember, a radiating arm carrying relatively stationary contacts, which arm is adjustably mounted on said frame, a second radiating arm carrying relatively movable contacts that coöperate with the stationary contacts, a thermostatic member for positioning said second radiating arm whereby a contact thereupon will be moved to a circuit closing position, and an advancing mechanism between said thermostatic member and said second radiating arm for operating the latter from said thermostatic member.

17. In combination, a thermostatic controlling element and relatively stationary contacts associated therewith, movable contact pins, operatively connected to the thermostatic controlling element, arranged to successively engage the stationary contacts and close an electric circuit as the thermostatic controlling element is actuated by changes of temperature in the same direction, said movable contact pins being so constructed and so operatively associated with the thermostatically controlling element that a change of temperature in an opposite direction causes a stationary contact or contacts to be skipped and an advanced circuit to be closed.

18. In combination, a thermostatic controlling element, relatively stationary insulated contact pins associated therewith, movable insulated contact pins and mechanism, comprising a lost motion construction, for operating the movable insulated contact pins from the thermostatic controlling element in a manner to successively engage the stationary contact pins and close an electric circuit as the thermostatic controlling element is actuated by changes of temperature in the same direction and in a manner to permit a stationary contact pin or pins to be skipped and to cause an advanced circuit to be closed as the thermostatic controlling element is actuated by a change of temperature in the opposite direction.

19. In combination, a thermostatic controlling element, relatively stationary contacts, a movable member having a plurality of spaced contacts arranged to successively engage said relatively stationary contacts and an advancing mechanism between said thermostatic controlling element and said movable member carrying the spaced contacts, said advancing mechanism comprising a lost motion construction.

20. In combination, a thermostatic controlling element, relatively stationary contacts, a movable member carrying a first set of contacts which are arranged to successively engage said stationary contacts, said movable member also carrying a second set of spaced contacts, each contact of the second set being electrically connected with a contact of the first set of spaced contacts, there being a projection or contact member actuated by the thermostatic controlling element which projection or contact member is arranged to move between said second set of spaced contacts and so as to complete a circuit through one contact of said second set when in engagement therewith and when the corresponding contact of said first set is in engagement with one of said stationary contacts.

This specification signed and witnessed this 18th day of March, A. D. 1915.

CHARLES R. BURLEW

Signed in the presence of—
 WALTER B. J. MITCHELL,
 EDWARD G. MCANANEY.